Patented Apr. 23, 1940

2,198,494

UNITED STATES PATENT OFFICE 2,198,494

ELECTROLYTE

Alexander M. Georgiev, Dayton, Ohio, assignor to General Motors Corporation, Detroit, Mich., a corporation of Delaware No Drawing. Application January 22, 1937, Serial No. 121,823

14 Claims. (Cl. 175—315)

This invention relates to electrolytes for electrolytic cells such as electrolytic condensers, rectifiers and the like; and while not at all limited thereto, the electrolyte of this invention is particularly adapted for use in aluminum electrode condensers which have formed on the electrodes a dielectric film, and especially those of the so-called dry type in which the electrolyte is substantially absorbed in an absorbent material, the latter serving also as a spacer between the electrodes.

The application is a continuation in part of my pending application 35,263, filed August 8, 1935.

In general there are certain qualities that an electrolyte should possess, to be entirely satisfactory in an electrolytic condenser. That is:

(1) The electrolyte should not attack the electrodes, the film on the electrodes, the terminals, connections or container, or the spacer of the cell.

(2) The electrolyte must be an effective film-forming and film-maintaining agent.

(3) The electrolyte should be substantially permanent in its chemical constitution and physical properties. Hence, it should not be apt to decompose under operating conditions, or exhibit precipitation and stratification or undergo other changes.

(4) The electrical resistance of the electrolyte should not be too low, because if it is, the protective film is weakened and the breakdown voltage is lowered. However, on the other hand, the resistance should not be too high, because the electrical losses are thereby increased and the efficiency of the cell is reduced.

(5) The electrolyte should readily penetrate into the pores and/or interstices of the spacer when used in dry type cells. This facilitates impregnation and provides for thorough covering of the electrodes.

(6) In some instances, the variations of the electrical characteristics of the cell, such as capacity, power factor, leakage current and breakdown voltage, with temperature changes are important. These variations of the characteristics of the cell depend very materially upon the properties of the electrolyte used. Hence, the electrolyte is preferably chosen to meet the specific operating requirements of the cell.

Electrolytes, such as those containing glycerol and a boric acid compound have been known in the art. Hence, to provide a better understanding of the present invention, some of the distinctions and advantages of this electrolyte over those previously known will be discussed.

The usual electrolytes prepared from glycerol and boric acid compounds exhibit marked acidity and are frequently apt to attack the electrodes; while electrolytes prepared in accordance with the present invention are almost neutral within a wide range of proportions of the ingredients, and do not attack the electrodes. Furthermore, electrolytes prepared in accordance with this invention do not noticeably attack the film, even during long periods in which the cell is not in use. Rather, the electrolyte has good film-forming and maintaining properties, indicated by low leakage current.

Ammonium acetate, or acetic acid and ammonium hydroxide are more soluble in a polyhydroxy alcohol, such as glycerol or ethylene glycol, than is boric acid. The electrolyte solution is therefore easier to make.

Being readily soluble in glycerol or ethylene glycol, the ionogen of this invention permits wide variations in cell characteristics, so that cells can be easily adapted to widely varying services, such as use on high or low voltage, where high or low capacity is desired, use in intermittent or continuous service, use on pure alternating current or where direct and alternating currents are superimposed, and use under different operating temperature conditions.

An electrolyte utilizing ammonium acetate or acetic acid and ammonium hydroxide admixed with glycerol has a lesser tendency toward producing a precipitate than do some of the other electrolytes. This factor is of considerable importance, because with the present composition, the electrolyte is more uniform throughout the cell in which it is used.

It has also been found that some electrolytes, such as some of those utilizing glycerol and a boric acid compound, assume a gummy or viscous character, or harden when subjected to heat that occurs under severe operating conditions. An electrolyte prepared in accordance with this invention, with ammonium acetate, or its equivalent, as the ionogen does not exhibit such tendency to harden, even when heated to quite severe and unusual temperatures.

Furthermore, with a small proportion by weight of ammonium acetate or acetic acid and ammonium hydroxide in the electrolyte, a greater conductivity of the electrolyte results than when other materials, such as boric acid compounds, are used. Consequently, by utilizing the present invention, an electrolyte having conductivity that is sufficiently high for proper and very satisfactory use can be prepared that is very fluid, and will easily penetrate the absorbent material used in the dry type of electrolytic condensers, even when they are impregnated in rolled or assembled form. The latter advantage in impregnation is important in the dry type of electrolytic condensers, because thorough impregnation of the condenser is essential, and because it makes such thorough impregnation possible in a shorter time and at a lower temperature. The lower temperature of impregnation makes the process simpler and minimizes the danger of losing some of the components of the electrolyte due to evaporation.

It is therefore an object of this invention to provide an electrolyte for electrolytic cells that utilizes materials that are readily soluble in substances, such as a polyhydroxy alcohol.

It is another object of this invention to provide an electrolyte for the electrolytic cells that minimizes the tendency to form any precipitate therein, and therefore is and remains substantially uniform throughout the cell in which it is used.

Another object of this invention is to provide an electrolyte for electrolytic cells which has a sufficiently high value of conductivity when only a relatively small amount of material is added to the solvent, so that the electrolyte is relatively thin in consistency at normal temperatures.

Another object is to provide an electrolyte for electrolytic cells that is easy and economical to manufacture and to introduce into the cells in which it is used.

Another object of this invention is to provide an electrolyte for electrolytic cells that is substantially stable physically and chemically under operating conditions over a wide range of ionogen concentrations.

Another object of this invention is to provide an electrolyte for electrolytic cells that has good film-forming and maintaining qualities, and does not attack the film, electrodes, terminals or any parts in contact therewith.

Another object of this invention is to provide an electrolyte for electrolytic cells that is relatively fluid at normal temperatures, even when relatively high percentages of the ionogen are used, so that heating to high temperatures during impregnation of absorbent spacer type units is unnecessary.

Another object of this invention is to provide an electrolyte for electrolytic cells that does not get gummy or hardened under severe operating conditions.

It is also an object to provide a method by which an electrolyte having one or more of the above qualities can be produced.

Further objects and advantages of the present invention will be apparent from the following description.

As previously mentioned, the electrolyte of the present invention is more particularly adapted to use in the electrolytic cell itself, and preferably in cells having electrodes upon which the film has been formed. The cell may be of either the wet or dry type, but the electrolyte of this invention is very satisfactory for cells of the dry type having an absorbent material for absorbing the electrolyte and spacing the electrodes. Therefore, although not limited thereto, the description will include the particular steps necessary in adapting the electrolyte to the dry type of cell.

Broadly, the electrolyte of the present invention comprehends a polyhydroxy alcohol, such as ethylene glycol or preferably substantially dry glycerol, having added thereto either acetic acid and ammonium hydroxide or ammonium acetate. It is understood that there is a chemical reaction between acetic acid and glycerol when acetic acid is added to the glycerol. It is also understood that further chemical reaction takes place when ammonium hydroxide is added to the substance resulting from the mixture of glycerol and acetic acid. Since electrolytes having similarly good properties can be obtained by making an electrolyte by either separately adding acetic acid and ammonium hydroxide or by adding ammonium acetate to a polyhydroxy alcohol, such as glycerol or ethylene glycol, it is not deemed particularly vital to this discussion whether the final chemical make up of the electrolytes thus made is exactly the same or not. The control of the acidity of the electrolyte is easier when the acetic acid, polyhydroxy alcohol and ammonium hydroxide are used. Such acidity control may be desirable to adapt a condenser to a particular use. However, both electrolytes are so similar that they both are clearly within the scope and spirit of the present invention. It is further understood that instead of ammonium hydroxide, ammonia gas can be used to effect substantially the same result as that obtained by the use of ammonium hydroxide, such as by bubbling the gas through the substance as a step in the process of manufacture.

Although not desiring to be limited in any way to the particular proportions or percentages of substances, the following is an example of an electrolyte and a process for making the same that comes within the scope of the present invention, and contains proportions of ingredients that are near the preferable minimum limit of the ionogen concentration. A polyhydroxy alcohol, preferably substantially dry and pure glycerol, is thoroughly admixed with acetic acid, preferably glacial acetic acid, in proportions of 98 percent glycerol to two percent glacial acetic acid. Then, to this is added ammonium hydroxide, preferably 26 percent solution of ammonia water, to the extent of five percent of the total weight of glycerol and acetic acid.

An electrolyte made according to the above described exemplary proportions, although quite flowable, is preferably heated in an autoclave or vessel adapted to be substantially sealed with respect to the atmosphere or opened. The heating further facilitates impregnation of the condenser units; while the heating and autoclave provide for control of evaporation and moisture content of the electrolyte. By opening the autoclave when heat is applied to the electrolyte, the moisture content of the electrolyte is reduced; while closing of the autoclave during impregnation prevents appreciable change of moisture content or evaporation of electrolyte during impregnation, although heat is applied to the electrolyte to facilitate impregnation. The heating reduces the viscosity of the electrolyte and increases the rate of penetration of the electrolyte into the absorbent material. It is generally only desirable to drive off moisture in the control of the water or moisture content of the electrolyte when it is made by using ammonium hydroxide as described above.

To illustrate and emphasize the fact that although the proportions of the electrolyte and the method of preparation given above may be preferred for condensers or the like having particular characteristics, the proportions of the polyhydroxy alcohol, acetic acid and ammonium hydroxide or polyhydroxy alcohol and ammonium acetate may be widely different, and such different proportions might well be preferred for a condenser or cell where different characteristics are desirable. As a further example and again not as a limitation upon the invention, it is pointed out that an electrolyte having as high as 40 percent by weight of ammonium acetate and substantially 60 percent of polyhydroxy alcohol does not tend to form a precipitate over long periods of time, is stable in electrolytic condenser cells and is very flowable to an extent that even condensers of the rolled type having dense paper, such as linen paper separators, can be easily and thoroughly impregnated. Such dense paper is particularly desirable in condensers for use on higher voltages, because it insures a higher safety factor. At present more absorbent paper is commonly used, although it does not insure a very high safety factor but because it will absorb the highly viscous electrolytes that are now used in the art. Furthermore, other things being equal, the more flowable electrolyte is also more desirable, because a greater quantity will be absorbed, thus insuring longer life of the condenser, particularly under adverse conditions.

As an example of the advantage of having available such a wide range of variation of the proportions of the electrolyte ingredients, it is pointed out that for best results certain proportions and characteristics are preferable, depending upon the operating conditions for which the cell is designed. That is, as a rule, condensers or cells intended for use on higher voltages should have an electrolyte having a higher electrical resistance, so that higher breakdown voltage is insured. On the other hand, lower voltage condensers or cells can utilize an electrolyte having a lower resistance, which lower resistance is preferable to reduce the electrical losses of the cell. In selecting the electrolyte proportions, it is understood that within a wide range, increasing the percentage or concentration of the ionogen increases the conductivity of the electrolyte.

As previously emphasized, it is preferable to keep the concentration below the point at which a precipitate forms which, for example, in the present instance is about 50 percent by weight of ammonium acetate. On the other hand, a concentration of ionogen that is too low as, for example, one or two percent by weight of ammonium acetate does not as effectively maintain the dielectric film.

The above examples therefore give the preferred or desirable limiting factors. It may be added, however, that for a dry electrolytic condenser, such as those used for starting small alternating current motors of about 110 volts rating, particularly desirable results can be obtained when an electrolyte is used that has about 10 percent by weight of ammonium acetate and 90 percent of glycerol or ethylene glycol. For condensers such as this a preferable range of resistance for the cell is from 7,000 to 23,000 ohms per centimeter cube at 85° F. Satisfactory condensers can be made for certain purposes having an allowable range of resistance for the electrolyte of from 1,500 to 30,000 ohms per centimeter cube at 85° F.

While the embodiment of the present invention as herein disclosed, constitutes a preferred form, it is to be understood that other forms might be adopted, all coming within the scope of the claims which follow.

What is claimed is as follows:

1. As a substantially neutral non-aqueous electrolyte of relatively high fluidity for an electrolytic cell, the combination including as ingredients a polyhydroxy alcohol, acetic acid and ammonium hydroxide.

2. As a substantially neutral non-aqueous electrolyte of relatively high fluidity for an electrolytic cell, a composition comprehending the combination of a polyhydroxy alcohol, glacial acetic acid and ammonium hydroxide.

3. As a substantially neutral non-aqueous electrolyte of relatively high fluidity for an electrolytic cell, a composition comprehending the combination of glycerol, acetic acid and ammonium hydroxide.

4. As a substantially neutral non-aqueous electrolyte of relatively high fluidity for an electrolytic cell, a composition comprehending the combination of a polyhydroxy alcohol and ammonium acetate.

5. As a substantially neutral non-aqueous electrolyte of relatively high fluidity for an electrolytic cell, the combination comprehending the combination of glycerol and ammonium acetate.

6. The method of preparing an electrolyte for electrolytic cells comprising the steps of admixing substantially dry glycerol and acetic acid in proportions of more than 40 percent glycerol and more than one percent glacial acetic acid and then admixing therewith more than one percent of the total weight of ammonium hydroxide.

7. The method of preparing an electrolyte for electrolytic cells comprising the steps of admixing substantially dry glycerol and acetic acid in proportions of more than 40 per cent glycerol and more than one percent glacial acetic acid and then admixing therewith more than one percent of the total weight of a 26 percent solution of ammonia water.

8. The method of preparing an electrolyte for electrolytic cells comprising the steps of admixing a polyhydroxy alcohol and ammonium acetate in proportions of approximately 90 percent of the polyhydroxy alcohol and approximately 10 percent ammonium acetate.

9. As a substantially neutral non-aqueous electrolyte of relatively high fluidity for an electrolytic cell, the composition including the reaction products of the combination of a polyhydroxy alcohol, acetic acid and ammonia gas.

10. The method of preparing an electrolyte for electrolytic cells comprising the steps of admixing a polyhydroxy alcohol, acetic acid and ammonium hydroxide, controlling the moisture content thereof by heating in an open autoclave, and closing the autoclave when the desired moisture content is reached.

11. The method of preparing an electrolyte for electrolytic cells comprising the steps of admixing a polyhydroxy alcohol and acetic acid, bubbling ammonia gas through the admixed polyhydroxy alcohol and acetic acid, and heating the resultant liquid in a closed autoclave which prevents ingress and egress of any substantial amount of moisture.

12. The method of preparing an electrolyte for electrolytic cells comprising the steps of admixing a polyhydroxy alcohol and ammonium acetate, and heating the resultant liquid in a closed autoclave which prevents ingress and egress of any substantial amount of moisture.

13. As a substantially neutral non-aqueous electrolyte of relatively high fluidity for an electrolytic cell, the composition comprising the reaction products of compounds including a polyhydroxy alcohol, the acetic acid radical, and a member of the group characterized by the compound ammonia.

14. The method of preparing a substantially neutral non-aqueous electrolyte of relatively high fluidity for use in electrolytic cells which comprises admixing with a polyhydroxy alcohol chemical compounds including the acetic acid radical, and a member of the group characterized by the compound ammonia in quantities sufficient to preclude the presence of any substantial quantity of free acid in solution.

ALEXANDER M. GEORGIEV.